US007005475B2

(12) United States Patent
Griswold

(10) Patent No.: US 7,005,475 B2
(45) Date of Patent: Feb. 28, 2006

(54) CURABLE SILICONE COMPOSITIONS HAVING IMPROVED ADHESION TO POLYMERIC FILMS

(75) Inventor: Roy Melvin Griswold, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 10/458,504

(22) Filed: Jun. 10, 2003

(65) Prior Publication Data

US 2004/0254274 A1   Dec. 16, 2004

(51) Int. Cl.
C08L 83/00 (2006.01)

(52) U.S. Cl. .................. 524/861; 524/862; 524/863; 525/477; 525/478; 525/479; 528/31; 528/32

(58) Field of Classification Search ............... 528/15, 528/31, 32; 525/477, 479
See application file for complete search history.

(56) References Cited

U.S. PATENT DOCUMENTS

| | | | |
|---|---|---|---|
| 3,344,111 A | 9/1967 | Chalk | |
| 3,418,731 A | 12/1968 | Anciaux | |
| 3,419,593 A | 12/1968 | Willing | |
| 3,445,420 A | 5/1969 | Kookootsedes et al. | |
| 3,461,185 A | 8/1969 | Brown | |
| 3,699,072 A * | 10/1972 | Clark et al. ............. | 524/862 |
| 3,882,083 A | 5/1975 | Berger et al. | |
| 3,989,667 A | 11/1976 | Lee et al. | |
| 4,043,977 A | 8/1977 | deMontigny et al. | |
| 4,057,596 A | 11/1977 | Takamizawa et al. | |
| 4,061,609 A | 12/1977 | Bobear | |
| 4,256,870 A | 3/1981 | Eckberg | |
| 4,337,332 A | 6/1982 | Melancon et al. | |
| 4,347,346 A | 8/1982 | Eckberg | |
| 4,386,135 A | 5/1983 | Campbell et al. | |
| 4,465,818 A | 8/1984 | Shirahata et al. | |
| 4,472,563 A | 9/1984 | Chandra et al. | |
| 4,476,166 A | 10/1984 | Eckberg | |
| 4,533,575 A | 8/1985 | Melancon | |
| 4,562,096 A | 12/1985 | Lo et al. | |
| 4,772,515 A | 9/1988 | Hara et al. | |
| 4,783,552 A | 11/1988 | Lo et al. | |
| 5,036,117 A | 7/1991 | Chung et al. | |
| 5,506,289 A | 4/1996 | McDermott et al. | |
| 5,516,558 A | 5/1996 | O'Brien | |
| 5,567,764 A | 10/1996 | Brasseur et al. | |
| 5,804,631 A * | 9/1998 | Mine et al. ............. | 524/440 |
| 5,985,371 A * | 11/1999 | Fujioka et al. .......... | 427/387 |
| 6,559,246 B1 | 5/2003 | Kuroda et al. .......... | 524/478 |

FOREIGN PATENT DOCUMENTS

| | | |
|---|---|---|
| EP | 0 057 984 A2 | 1/1982 |
| EP | 0 226 934 A2 | 9/1986 |
| EP | 0 226 934 B1 | 9/1986 |
| JP | 07097520 A2 | 4/1995 |

* cited by examiner

Primary Examiner—Marc S Zimmer
(74) Attorney, Agent, or Firm—Dominick G. Vicari

(57) ABSTRACT

The present invention relates to curable silicone coating compositions having improved adhesion to polymeric substrates. The present invention also relates to additives that improve adhesion of silicone pressure sensitive adhesive coating compositions to polymeric substrates. Furthermore the present invention relates to the process for making a silicone pressure sensitive adhesive coating with improved adhesion to polymeric substrates.

23 Claims, No Drawings

CURABLE SILICONE COMPOSITIONS HAVING IMPROVED ADHESION TO POLYMERIC FILMS

FIELD OF THE INVENTION

The present invention relates to curable silicone coating compositions having improved adhesion to polymeric substrates. The present invention also relates to additives that improve adhesion of silicone pressure sensitive adhesive coating compositions to polymeric substrates. Furthermore the present invention relates to the process for making a silicone pressure sensitive adhesive coating with improved adhesion to polymeric substrates.

BACKGROUND OF THE INVENTION

Curable silicone compositions are applied to substrates to aid in the adhesion of silicone pressure sensitive adhesive compositions thereon. Laminates comprising a curable silicone composition coated polymeric film with a silicone pressure sensitive adhesive coated thereon and a polymeric film ensures the adhesion to the desired substrate surface as the case for self wound silicone pressure sensitive adhesive tapes where the adhesive preferentially is anchored to the curable silicone coated film side. Anchorage of a silicone pressure sensitive adhesive to a curable silicone coated polymeric film is essential for application wherein residue remaining after the adhesive is removed needs to be minimal, i.e. electronic masking tape, plasma masking tape applications.

Typically these curable silicone compositions cure by one of two mechanisms, thermal hydrosilylation or condensation curing. Thermally hydrosilylation curing systems generally are comprised of the following compositions:

(A) a linear alkenyl substituted polysiloxane or a linear silanol substituted polymer that is the primary component or base polymer of the curable composition;

(B) a hydride functional cross-linking silicone, typically a methyl hydrogen siloxane polymer, copolymer or oligomer;

(C) an addition cure hydrosilylation catalysts, typically either a platinum or rhodium based catalyst or a condensation catalyst, typically organo tin or organo titanates;

(D) a cure inhibiting compound or mixtures thereof to increase the useful life of the coating bath when cure is by hydrosilation.

The alkenyl functional silicone polymer release compositions typically used fall into one of two categories:

1) a linear alkenyl chain-stopped polymer:

$$M^{vi}D_xM^{vi} \quad 4)$$

where $M^{vi}$ indicates an alkenyl chain-stopping M group or 2) multi-functional alkenyl copolymers:

$$M^{vi}D_xD^{vi}{}_yM^{vi} \quad 5)$$

where $D^{vi}$ indicates an alkenyl substituted D group. The alkenyl chain stopped polymers, $M^{vi}D_xM^{vi}$, generally cure faster than the multi-functional copolymers, $M^{vi}D_xD^{vi}{}_yM^{vi}$. As release composites are delaminated, the formulations based on the linear alkenyl chain-stopped polymers show significant increases in the delaminating force necessary as delaminating speed increases. In contrast, while the multi-functional alkenyl polymers tend to have a slower curing speed the increase in delaminating force with increasing delaminating speed is not nearly as great proportionately.

While the general practice usually employs linear base polymers, (A), solventless, high solids content formulations have been described. As described in U.S. Pat. No. 4,448,815 ('815) a linear alkenyl siloxane base copolymer is a copolymer of:

$$(1)\ R_cR_d^1Si_{(4-c-d)/2} \quad 1)$$

where R is generally an alkyl radical, $R^1$ is a low molecular weight olefinic substituent such as vinyl or allyl, c has value from 0 to 2 and the average of value of the sum c+d is 0.8 to 3; and $$(2)\ R_nSiO_{(4-n)/2} \quad 2)$$

where R is generally an alkyl radical and n has a value of 0.8 to 2.5. The preferred base copolymer of the '815 patent has the following linear structure:

$$(H_2C=CH)R_2Si-O-(R_2Si-O-)_i-(RR^1Si-O-)_j-SiR_2(H_2C=CH)$$

where the subscripts i and j are integers.

U.S. Pat. No. 4,774,111 ('111) describes a variation of the above linear copolymer where the R group in formula 2 is selected from alkyl and alkenyl radicals. The polymer of the '111 patent is defined as being substantially linear, i.e. having no more than a trace amount of T or Q groups. This substantially linear requirement for alkenyl functional heat curing silicone release compositions is repeated in U.S. Pat. Nos. 4,772,515; 4,783,552 and 5,036,117.

In contrast, the possibility of branched alkenyl polymers is admitted by the structural formulas recited in U.S. Pat. No. 4,057,596 ('596). In the '596 patent the composition comprises:

(A') a substantially linear vinyl chain stopped polymer;
(B') a linear methyl hydrogen polymer;
(C') a methyl vinyl polysiloxane having at least three vinyl groups per molecule;
(D') a methyl hydrogen polysiloxane having at least three hydride hydrogen atoms per molecule; and
(E') a platinum hydrosilylation catalyst.

Component (C') is described in the '596 patent as containing $(H_2C=CH)(CH_3)SiO_{2/2}$ ($D^{vi}$), $(H_2C=CH)(CH_3)_2SiO_{1/2}$ ($M^{vi}$), and $(H_2C=CH)SiO_{3/2}$ ($T^{vi}$), units either singly or in combination with $(CH_3)_2SiO_{2/2}$ (D), $(CH_3)_3SiO_{1/2}$ (M), and $(CH_3)SiO_{3/2}$ (T). The optional inclusion of vinyl substituted T units and methyl T units permits the composition of the '596 patent to possess branched structures.

U.S. Pat. No. 4,386,135 describes a terminally unsaturated silicone polymer having the formula $$R_{4-a}Si((R_2SiO-)_bOSiR_2R^2)_a \quad 3)$$

where a may be 2, 3, or 4. When a=4 the formula produces a Q resin. When a=3, a T structure results and the structure possesses only a single branch point. When a=2, the formula devolves to an alkenyl chain stopped linear polymer.

Japanese patent publication Sho 46-2187 (2187/1971) teaches blending an epoxy functional silane and vinyltriacetoxysilane to improve anchorage of release coatings as described above onto paper and polymeric films. However, the acyloxy group liberated has the disadvantages of inhibiting addition cure, therefore slowing the addition curing process; liberating corrosive and objectionable odor hydrolysis products during the coating process. Furthermore, the acyloxy groups remaining in the release coating hydrolyzed over resulting in an undesirable interaction with the adhesive thus leading to undesirable delaminating release properties.

European patent 0226934A2 teaches adhesion promoting additives comprised of resins having alkenyl and alkoxy functional groups, blended with an epoxy functional silane. To those skilled in the art, it can be readily recognized that these have the disadvantage of increasing the release force during the delaminating process due to the resinous nature of the additive preventing low release force coatings from being available.

Japanese patent 07097520A2 teaches adhesion promoters comprised of alkenyl and meth(acryl)oxy functional cycloorganopolysiloxanes as additives for a release coating on polymeric films.

U.S. Pat. No. 5,567,764 teaches alkoxy containing alkenyl functional organopolysiloxanes as adhesion promoters for release coating onto polymeric films.

European patent 057984A2 teaches meth(acryl)oxy functional alkoxysilanes as adhesion promoters for release coatings on polymeric films.

Despite the above cited patents there still remains a need in the industry for curable silicone coating compositions, adhesion promoting additives which address the disadvantages of either stable adhesion of silicone pressure sensitive adhesive compositions to polymeric films, exhibit non-inhibiting effect on the curing, not liberate corrosive hydrolysis products, not exhibit objectionable odor during manufacturing of the laminate construction, and a cost effective reproducible method of manufacture.

It is the object of this invention to provide a curable silicone coating, additive for that provides adhesion of silicone pressure sensitive adhesive compositions to polymeric films, does not inhibit the addition or condensation cure process of the curable silicone composition, does not liberate corrosive hydrolysis products, does not exhibit an objectionable odor during the manufacturing of the laminate construction. Furthermore, it is an objective of this invention to provide a process for making an additive exhibiting stable adhesion on polymeric films when added to a curable silicone coating.

SUMMARY OF THE INVENTION

Curable silicone compositions are applied to substrates to aid in the adhesion of silicone pressure sensitive adhesive compositions thereon. Laminates comprising a curable silicone composition coated polymeric film with a silicone pressure sensitive adhesive coated thereon and a polymeric film ensures the adhesion to the desired substrate surface as the case for self wound silicone pressure sensitive adhesive tapes where the adhesive is anchored to the silicone composition coated film. Anchorage of a silicone pressure sensitive adhesive to a curable silicone coated polymeric film is essential for application wherein residue remaining after the adhesive is removed needs to be minimal, i.e. electronic masking tape, plasma masking tape applications.

The curable silicone compositions of the present invention comprise additives for improved anchorage of silicone pressure sensitive adhesive composition coatings comprising:

$$(R_aSiO_{(4-a)/2})_n$$

where n is an integer greater than 3, a is from 1 to 3, R is an alkylenealkoxysilyl containing radical having from one to forty carbon atoms, monovalent hydrocarbon or hydrocarbonoxy radicals, with at least one alkylenealkoxysilyl containing radical being present on the molecule.

The present invention further provides for an alkenyl curable silicone composition of the formula $$M^{vi}_aT_bD_cM_d$$

where $M^{vi}=R^1_{3-p}R^2_pSiO_{1/2}$, where $R^1$ is selected from the group consisting of one to forty carbon monovalent hydrocarbon radicals and $R^2$ is selected from the group consisting of two to forty carbon atom olefinic monovalent hydrocarbon radicals, where p ranges from 1 to 3; $T=R^3SiO_{3/2}$ where $R^3$ is selected from the group consisting of $R^1$ and $R^2$, $D=R^4R^5SiO_{2/2}$ where $R^4$ and $R^5$ are each independently selected from the group consisting of $R^1$ and $R^2$, and $M=R^1_3SiO_{1/2}$ where each $R^1$ is independently selected and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three.

The present invention further provides when an alkenyl curable silicone composition is not selected for a condensation curable silicone composition of the formula:

$$MR^6_aT_bD_cM_d$$

where $T=R^7SiO_{3/2}$, $D=R^8SiO_{2/2}$, and $M=R'_3SiO_{1/2}$, where each of $R^6$, $R^7$, $R^8$ and $R'$ is independently selected from the group of from one to forty carbon atoms consisting of monovalent hydrocarbon, hydrocarbonoxy and hydroxyl radicals, and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three.

The curable silicone compositions of the present invention comprise:

(A) additives for improved anchorage of release coatings comprising:

$$(R_aSiO_{(4-a)/2})_n$$

where n is an integer greater than 3, a is from 1 to 3, R is a silicon-hydride and or an alkylenealkoxysilyl containing radical having from one to forty carbon atoms, monovalent hydrocarbon or hydrocarbonoxy radicals, with at least one silicon-hydride and one alkylenealkoxysilyl containing radical being present on the molecule (B) a silicone composition selected from:

(i) an alkenyl silicone having the formula:

$$M^{vi}_aT_bD_cM_d$$

where the subscripts a, b, c, and d are as previously defined;

(C) a hydrogen siloxane selected from the group of compounds:

$MD_eD'_fM$ $MD'_fM$, $MD_eD'_fM'$ $M'D_eD'_fM'$, and $M'D_eM'$ where M is as previously defined and $M'=H_g R'_{3-g}SiO_{1/2}$ $D=R'R'SiO_{2/2}$ where each R' is independently selected and $D'=R'HSiO_{2/2}$ where R' is as previously defined, the subscripts e and f may be zero or positive wherein the sum of e and f ranges from about 10 to about 100 subject to the limitation that the sum of f and g is two or greater or (ii) a condensation silicone having the formula:

$$M^*R^6{}_aT^*{}_bD^*{}_cM^*{}_d$$

where $R^6$ and the subscripts a, b, c, and d are as previously defined;

(C) a hydrogen siloxane selected from the group of compounds:

$MD_eD'_fM$
$MD'_fM$,
$MD_eD'_fM'$
$M'D_eD'_fM'$, and
$M'D_eM'$ where M is as previously defined and $M'=H_g R'_{3-g}SiO_{1/2}$ $D=R'R'SiO_{2/2}$ where each R' is independently selected and $D'=R'HSiO_{2/2}$ where R' is as previously defined, the subscripts e and f may be zero or positive wherein the sum of e and f ranges from about 10 to about 100 subject to the limitation that the sum of f and g is two or greater and (D) a hydrosilylation catalyst for B(i) curable composition comprising a metal selected from the group consisting of nickel, palladium, platinum, rhodium, iridium, ruthenium and osmium, or condensation catalyst for B(ii) curable composition comprising a metal selected from the group consisting of organotin, and organotitanate; and (E) a cure inhibitor when a hydrosilylation catalyst is used as in (B) (i).

The amount of component (A) that is used in this invention range from about 0.1 to 5.0 parts, preferably from 0.5 to 4.0, and more preferably from about 0.5 to 3.0 parts.

The amounts of Components (B) and (C) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

DETAILED DESCRIPTION OF THE INVENTION

Curable silicone coatings are part of a laminate wherein a curable silicone coating is coated upon a substrate. Generally substrates suitable for curable silicone coatings of the present invention are selected from the group consisting polymeric films such as those consisting of polyethylene, polypropylene, polyester, polyimide.

The curable silicone compositions of the present invention comprise additives for improved anchorage of silicone pressure sensitive adhesive coatings comprising:

$$(R_aSiO_{(4-a)/2})_n$$

where n is an integer greater than 3, a is from 1 to 3, R is a silicon-hydride and or an alkylenealkoxysilyl containing radical having from one to forty carbon atoms, monovalent hydrocarbon or hydrocarbonoxy radicals, with at least one silicon-hydride and one alkylenealkoxysilyl containing radical being present on the molecule The present invention further provides for an alkenyl curable silicone composition of the formula $$M^{vi}{}_aT_bD_cM_d$$

where $M^{vi}=R_{3-p}R^1{}_pSiO_{1/2}$, where R is selected from the group consisting of one to forty carbon monovalent hydrocarbon radicals and $R^1$ is selected from the group consisting of two to forty carbon atom olefinic monovalent hydrocarbon radicals, where p ranges from 1 to 3; $T=R^2SiO_{3/2}$ where $R^2$ is selected from the group consisting of R and $R^1$, $D=R^3R^4SiO_{2/2}$ where $R^3$ and $R^4$ are each independently selected from the group consisting of R and $R^1$, and $M=R_3SiO_{1/2}$ where each R is independently selected and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three.

The present invention further provides when an alkenyl curable silicone composition is not selected for a condensation curable silicone composition of the formula:

$$M^*R^6{}_aT^*{}_bD^*{}_cM^*{}_d$$

where $T^*=R^7SiO_{3/2}$, $D^*=R^8SiO_{2/2}$ and $M^*=R^9{}_3SiO_{1/2}$, where each of $R^6$, $R^7$, $R^8$ and $R^9$ is independently selected from the group of from one to forty carbon atoms consisting of monovalent hydrocarbon, hydrocarbonoxy and hydroxyl radicals, and the subscripts a and b have values ranging from about 2 to about 5 and c is an integer ranging from about 50 to about 1,000 and d has a value ranging from 0 to 0.5, preferably from 0.25 to about 0.5, more preferably from about 0.35 to about 0.5 and most preferably from about 0.4 to about 0.5. Applicants define the term substantially branched to mean that the average number of T branching sites per alkenyl silicone molecule of (A) is at least two and preferably three.

The release compositions of the present invention comprise:

(A) additives for improved anchorage of release coatings comprising:

$$(R_aSiO_{(4-a)/2})_n$$

where n is an integer greater than 3, a is from 1 to 3, R is an alkylenealkoxysilyl containing radical having from one to forty carbon atoms, monovalent hydrocarbon or hydrocarbonoxy radicals, with at least one alkylenealkoxysilyl containing radical being present on the molecule and (B) a silicone composition selected from:

(i) an alkenyl silicone having the formula:

$$M^{vi}{}_aT_bD_cM_d$$

where the subscripts a, b, c, and d are as previously defined;

(C) a hydrogen siloxane selected from the group of compounds:

$MD_eD'_fM$
$MD'_fM$,
$MD_eD'_fM'$

M'D$_e$D'$_f$M', and
M'D$_e$M' where M is as previously defined and
M'=H$_g$R'$_{3-g}$SiO$_{1/2}$
D=R'R'SiO$_{2/2}$ where each R' is independently selected and
D'=R'HSiO$_{2/2}$ where R' is as previously defined, the subscripts e and f may be zero or positive wherein the sum of e and f ranges from about 10 to about 100 subject to the limitation that the sum of f and g is two or greater or (ii) a condensation silicone having the formula:

$$M^{R^6}{}_aT_bD_cM_d$$

where $R^6$ and the subscripts a, b, c, and d are as previously defined;

(C) a hydrogen siloxane selected from the group of compounds:
MD$_e$D'$_f$M
MD'$_f$M,
MD$_e$D'$_f$M'
M'D$_e$D'$_f$M', and
M'D$_e$M' where M is as previously defined and
M'=H$_g$R'$_{3-g}$SiO$_{1/2}$
D=R'R'SiO$_{2/2}$ where each R' is independently selected and
D'=R'HSiO$_{2/2}$ where R' is as previously defined, the subscripts e and f may be zero or positive wherein the sum of e and f ranges from about 10 to about 100 subject to the limitation that the sum of f and g is two or greater and (D) a hydrosilylation catalyst for B(i) curable composition comprising a metal selected from the group consisting of nickel, palladium, platinum, rhodium, iridium, ruthenium and osmium, or condensation catalyst for B(ii) curable composition comprising a metal selected from the group consisting of organotin, and organotitanate; and (E) a cure inhibitor when a hydrosilylation catalyst is used.

The amount of component (A) that is used in this invention range from about 0.1 to 5.0 parts, preferably from 0.5 to 4.0, and more preferably from about 0.5 to 3.0 parts.

The amounts of Components (B) and (C) that are used in the compositions of this invention are not narrowly limited. Said amounts, expressed in terms of the ratio of the number of silicon-bonded hydrogen atoms of Component (B) to the number of silicon-bonded olefinic hydrocarbon radicals of Component (A), as is typically done, are sufficient to provide a value for said ratio of from 1/100 to 100/1, usually from 1/20 to 20/1, and preferably from 1/2 to 20/1.

Broadly stated, Component (D) of the composition of this invention is a catalyst component which facilitates the reaction of the silicon-bonded hydrogen atoms of Component (C) with the silicon-bonded olefinic hydrocarbon radicals of Component (B)(i) and silicon-bonded hydroxyl radicals of Component (B)(ii). Typical platinum-containing catalyst component in the organopolysiloxane compositions of this invention is any form of chloroplatinic acid, such as, for example, the readily available hexahydrate form or the anhydrous form, because of its easy dispensability in organosiloxane systems. A particularly useful form of chloroplatinic acid is that composition obtained when it is reacted with an aliphatically unsaturated organosilicon compound such as divinyltetramethyldisiloxane, as disclosed by U.S. Pat. No. 3,419,593 incorporated herein by reference.

Typical condensation catalyst component in the organopolysiloxane compositions of this invention is any form of organotin or organotitanate, such as, for example, dibutyltin diacetate, dibutyltin dilaurate, dibutyltin oxide, dibutyltin dineodecanoate, tetratisopropyl titanate, tetra(2-ethylhexyl) titanate, tetrabutyl titanate.

The amount of catalyst component that is used in the compositions of this invention is not narrowly limited as long as there is a sufficient amount to accelerate a room temperature reaction between the silicon-bonded hydrogen atoms of Component (C) with the silicon-bonded olefinic hydrocarbon radicals of Component (B)(i) or silicon-bonded hydroxyl radicals of Component (B)(ii). The exact necessary amount of said catalyst component will depend upon the particular catalyst and is not easily predictable. However, the said amount can be as low as one part by weight of platinum for every one million parts by weight of organosilicon Components (B) plus (C). Preferably said amount is at least 10 parts by weight, on the same basis.

For compositions of this invention which are to be used in the coating method of this invention, the amount of platinum-containing catalyst component to be used is preferably sufficient to provide from 10 to 500 parts by weight platinum per one million parts by weight of organopolysiloxane components (B)(i) plus (C).

The hydrosilylation catalyst is selected from the group consisting of catalysts comprising a metal selected from the group consisting of nickel, palladium, platinum, rhodium, iridium, ruthenium and osmium or as taught in U.S. Pat. Nos. 3,159,601; 3,159,662; 3,419,593; 3,715,334; 3,775,452 and 3,814,730.

Inhibitors, component (E), for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420; 4,347,346 and 5,506,289; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes. U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; half esters and half amides, U.S. Pat. No. 4,533,575; and various salts, such as U.S. Pat. No. 3,461,185. It is believed that the compositions of this invention can comprise an inhibitor from any of these classes of inhibitors.

The inhibitors may be selected from the group consisting of ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated ene-ynes, hydroperoxides, ketones, sulfoxides, amines, phosphines, phosphites, nitriles, and diaziridines.

Preferred inhibitors for the compositions of this invention are the maleates and alkynyl alcohols.

The amount of Component (E) to be used in the compositions of this invention is not critical and can be any amount that will retard the above-described platinum-catalyzed hydrosilylation reaction at room temperature while not preventing said reaction at moderately elevated temperature, i.e. a temperature that is 25 to 50° C. above room temperature. No specific amount of inhibitor can be suggested to obtain a specified bath life at room temperature since the desired amount of any particular inhibitor to be used will depend upon the concentration and type of the platinum group metal-containing catalyst, the nature and amounts of Components (A) and (B). The range of Component (E) can be 0.1–10% by weight, preferably 0.15–2% by weight, and most preferably 0.2–1% by weight.

The compositions of the present invention may be used either as formulations that are free of solvent, i.e. 100% solids, diluted with an organic solvent that is miscible, or as an aqueous emulsion. When the formulation of the present invention is used as a solventless coating, it is preferred that the viscosity of the alkenyl silicone be in a range varying from about 100 to about 10,000 centipoise, preferably from about 125 to about 1,000, more preferably from about 150 to about 500, and most preferably from about 200 to about 300 centipoise. This is most easily accomplished by manipulation of the ratios of the stoichiometric subscripts between the terminal M and $M^{vi}$ groups and the T groups in the formula:

$$M^{vi}_a T_b D_c M_d$$

with one general consideration being that a+d>b. If this condition is not met, the alkenyl silicone can become much more viscous. This does not preclude use of the silicone as a release coating material because the silicone may be dispersed or dissolved in a suitable solvent and coated thereby.

When used as emulsions, the silicones of the present invention are generally emulsified by the addition of non-ionic surfactants, addition of water followed by processing in a colloid mill.

All United States patents referenced herein are herewith and hereby specifically incorporated by reference.

EXPERIMENTAL

The following examples are designed to illustrate the present invention and are not to be construed as limiting the invention as embodied in these specific examples.

EXAMPLE 1

Preparation of Anchorage Additive:

Additive A

To a reaction flask equipped with mixing capability, condenser, nitrogen atmosphere and heating was added 100.0 g of polymethylhydrogensiloxane containing 1.6 wt % hydride, 0.08 g solution of tris(dibutylsulfide)rhodium(III) trichloride containing 1.2 wt % rhodium were heated under a nitrogen atmosphere to 95–100° C. Heat source was removed and 250.0 g vinyltrimethoxysilane (VTMS) added to maintain temperature between 95–141° C. The reaction product was diluted to 10 wt % solids in toluene.

Additive B

To a reaction flask equipped with mixing capability, condenser, nitrogen atmosphere and heating was added 380.0 g of polymethylhydrogendimethylsiloxane containing 1.05 wt % hydride, 0.15 g solution of a platinum divinyltetramethyldisiloxane complex containing 10.3 wt % platinum were heated under a nitrogen atmosphere to 95–100° C. Heat source was removed and 558.0.0 g vinyltrimethoxysilane (VTMS) added to maintain temperature between 100–125° C. Reaction mixture was heated an additional 5 hours. The reaction product was diluted to 10 wt % solids in toluene resulting in a 1.7 cstks. viscosity.

A curable coating formulation was prepared by mixing:

| | |
|---|---|
| [1]SS4191A | 13.3 g |
| [1]SS4191B | 0.14 g |
| [1]SS4191B | 0.50 g |
| [1]SS4259C | 0.30 g |
| [1]Toluene | 85.8 g |

This curable coating formulation with 1 weight % additives above were coated onto 1 mil polyimide film (PI) using a number 3 Mayer rod then cured at 80° C. for 30 seconds. Coated PI films samples were then adhesive coated using [1]PSA595 adhesive using a universal applicator rod then dried 10 minutes in air followed by curing for 2 minutes in a 177° C. convection oven. These were evaluated for adhesive anchorage by applying a 1-inch cut tape of the coated polyimide to clean stainless steel test panels, placing panels into a 200° C. oven for 2 hours, removal of panels followed by tapes being peeled from the panels while at 200° C. then examined for residue. The release coatings containing Additive A and Additive B at 1 weight % additive gave residue free panels. The curable coating formulation without additive failed due to adhesive transfer to the panel from the film.

[1] GE Silicones, solventless thermal release coating

The invention claimed is:

1. An aqueous emulsion including a curable composition comprising
   (A) additives for improved anchorage of pressure sensitive adhesive coatings comprising:

$$(R_a SiO_{(4-a)/2})_n$$

where n is an integer greater than 3, a is from 1 to 3, R is a silicon-hydride, an alkylenealkoxysilyl containing radical having from one to forty carbon atoms, or a monovalent hydrocarbon or hydrocarbonoxy radicals, with at least one silicon-hydride and one alkylenealkoxysilyl containing radical being present on the molecule and
   (B) a curable alkenyl silicone having the formula $$M^{vi}_a T_b D_c M_d$$

where $M^{vi}=R^1_{3-p}R^2_p SiO_{1/2}$, where $R^1$ is selected from the group consisting of one to forty carbon monovalent hydrocarbon radicals and $R^2$ is selected from the group consisting of two to forty carbon atom terminal olefinic monovalent hydrocarbon radicals, where p ranges from 1 to 3;
   $T=R^3 SiO_{3/2}$, where $R^3$ is selected from the group consisting of $R^1$ and $R^2$;
   $D=R^4 R^5 SiO_{2/2}$ where $R^4$ and $R^5$ are each independently selected from the group consisting of $R^1$ and $R^2$; and
   $M=R^1_3 SiO_{1/2}$ where each $R^1$ is as previously defined and is independently selected;
   wherein a and b have values ranging from 2 to 5, c is an integer ranging from about 50 to about 1,000 and d has a value ranging from 0 to about 0.5.

2. The composition of claim 1 additionally comprising a hydrogen siloxane selected from the group of compounds:
   $MD_e D'_f M$,
   $MD'_f M$,
   $MD_e D'_f M'$,
   $M'D_e D'_f M'$, and
   $M'D_e M'$
   where $M=R'_3 SiO_{1/2}$, M'=$H_gR'_{3-g}SiO_{1/2}$, and
D=$R'R'SiO_{2/2}$, and
D'=$R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater.

3. The composition of claim 1 where $R^1$ is methyl, trifluoropropyl or phenyl and $R^1$ is selected from the group consisting of two to ten carbon atom alkenyl groups.

4. The composition of claim 2 where R' is methyl, trifluoropropyl or phenyl.

5. The composition of claim 3 wherein the subscripts a, b, and d satisfy the relationship a+d>b.

6. The composition of claim 4 wherein the viscosity of the curable alkenyl silicone ranges from about 100 to about 10,000 centipoise.

7. The composition of claim 5 wherein the viscosity of the curable alkenyl silicone ranges from about 125 to about 1,000 centipoise.

8. The composition of claim 1 wherein the hydrogen siloxane is selected from the group consisting of $MD_eD'_fM$, $MD'_fM$, and mixtures thereof.

9. An aqueous emulsion including a curable composition comprising
(A) additives for improved anchorage of pressure sensitive adhesive coatings comprising:

$(R_aSiO_{(4-a)/2})_n$ where n is an integer greater than 3, a is from 1 to 3, R is a silicon-hydride, an alkylenealkoxysilyl containing radical having from one to forty carbon atoms or a monovalent hydrocarbon or hydrocarbonoxy radicals, with at least one silicon-hydride and one atkylene-alkoxysilyl containing radical being present on the molecule and (B) a curable alkenyl silicone having the formula $M^{vi}{}_aT_bD_cM_d$ where $M^{vi}=R^1{}_{3-p}R^2{}_pSiO_{1/2}$, where $R^1$ is selected from the group consisting of one to forty carbon monovalent hydrocarbon radicals and $R^2$ is selected from the group consisting of two to forty carbon atom terminal olefinic monovalent hydrocarbon radicals, where p ranges from 1 to 3;
T=$R^3SiO_{3/2}$, where $R^3$ is selected from the group consisting of $R^1$ and $R^2$;
D=$R^4R^5SiO_{2/2}$ where $R^4$ and $R^5$ are each independently selected from the group consisting of $R^1$ and $R^2$; and
M=$R^1{}_3SiO_{1/2}$ where each $R^1$ is as previously defined and is independently selected;
wherein a and b have values ranging from 2 to 5, c is an integer ranging from about 50 to about 1,000 and d has a value ranging from 0 to about 0.5

(C) a hydrogen siloxane selected from the group of compounds:
$MD_eD'_fM$,
$MD'_fM$,
$MD_eD'_fM'$,
$M'D_eD'_fM'$, and
$M'D_eM'$
where M=$R'_3SiO_{1/2}$,
M'=$H_gR'_{3-g}SiO_{1/2}$, and
D=$R'R'SiO_{2/2}$, and
D'=$R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater;

(D) a hydrosilylation catalyst; and
(E) an inhibitor.

10. A curable composition comprising:
(A) additives for improved anchorage of silicone pressure sensitive adhesive coatings comprising:

$(R_aSiO_{(4-a)/2})_n$ where n is an integer greater than 3, a is from 1 to 3, R is a silicon-hydride, an alkylenealkoxysilyl containing radical having from one to forty carbon atoms, or a monovalent hydrocarbon or hydrocarbonoxy radicals, with at least one silicon-hydride and one alkylene-alkoxysilyl containing radical being present on the molecule and (B) a condensation curable silicone having the formula:

$M^*{}_aT^*{}_bD^*{}_cM^*{}_d$ where
$T^*=R^7SiO_{3/2}$, $D^*=R^8SiO_{2/2}$, and $M^*=R^9{}_3SiO_{1/2}$, where each of $R^6$, $R^7$, $R^8$ and $R^9$ is independently selected from the group of from one to forty carbon atoms consisting of monovalent hydrocarbon, hydrocarbonoxy and hydroxyl radicals, with the proviso that at least two of $R^7$, $R^8$, and $R^9$ are hydrocarbonoxy or hydroxyl radicals, and the subscripts a and b have values ranging from about 2 to about 5 and c is an integer ranging from about 50 to about 1,000 and d has a value ranging from 0 to 0.5.

11. The composition of claim 10 additionally comprising a hydrogen siloxane selected from the group of compounds:
$MD_eD'_fM$,
$MD'_fM$,
$MD_eD'_fM'$,
$M'D_eD'_fM'$, and
$M'D_eM'$
where M=$R'_{3-g}SiO_{1/2}$
M'=$H_gR'_{3-g}SiO_{1/2}$, and
D=$R'R'SiO_{2/2}$, and
D'=$R'HSiO_{2/2}$ wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater.

12. The composition of claim 10 where R is methyl, trifluoropropyl or phenyl and $R^1$ is selected from the group consisting of two to ten carbon atom alkenyl groups.

13. The composition of claim 11 where R' is methyl, trifluoropropyl or phenyl.

14. The composition of claim 12 wherein the subscripts a, b, and d satisfy the relationship a+d>b.

15. The composition of claim 13 wherein the viscosity of the condensation silicone ranges from about 100 to about 10,000 centipoise.

16. The composition of claim 14 wherein the viscosity of the condensation silicone ranges from about 125 to about 1,000 centipoise.

17. An aqueous emulsion comprising the composition of claim 15.

18. The composition of claim 17 wherein the hydrogen siloxane is selected from the group consisting of $MD_eD'_fM$, $MD'_fM$ and mixture thereof.

19. A curable composition comprising
(A) additives for improved anchorage of pressure sensitive adhesive coatings comprising:

$$(R_aSiO_{(4-a)/2})_n$$

where n is an integer greater than 3, a is from 1 to 3, R is a silicon-hydride, an alkylenealkoxysilyl containing radical having from one to forty carbon atoms or a monovalent hydrocarbon or hydrocarbonoxy radicals, with at least one silicon-hydride and one alkylene-alkoxysilyl containing radical being present on the molecule and
(B) a condensation curable silicone having the formula:

$$M^*_aT^*_bD^*_cM^*_d$$

where
$T^*=R^7SiO_{3/2}$, $D^*=R^8SiO_{2/2}$, and $M^*=R^9_3SiO_{1/2}$, where each of $R^6$, $R^7$, $R^8$ and $R^9$ is independently selected from the group of from one to forty carbon atoms consisting of monovalent hydrocarbon, hydrocarbonoxy and hydroxyl radicals, with the proviso that at least two of $R^7$, $R^8$, and $R^9$ are hydrocarbonoxy or hydroxyl radicals, and the subscripts a and b have values ranging from about 2 to about 5 and c is an integer ranging from about 50 to about 1,000 and d has a value ranging from 0 to 0.5;

(C) a hydrogen siloxane selected from the group of compounds:
$MD_eD'_fM$,
$MD'_fM$,
$MD_eD'_fM'$,
$M'D_eD'_fM'$, and
$M'D_eM'$
where $M=R'_3SiO_{1/2}$,
$M'=H_gR'_{3-g}SiO_{1/2}$, and
$D=R'R'SiO_{2/2}$, and
$D'=R'HSiO_{2/2}$
wherein each R' in M, M', D, and D' is independently selected from the group consisting of one to forty carbon monovalent hydrocarbon radicals wherein the subscripts e and f may be zero or positive whereby the sum of e and f ranges from about 10 to about 100 subject to the limitation that the sum of f and g is two or greater;
(D) a condensation catalyst.

20. A laminate having a substrate and a coating said coating comprising the composition of claim 9.

21. A laminate having a substrate and a coating said coating comprising the composition of claim 19.

22. The laminate of claim 20 wherein the substrate is selected from the group consisting of polyethylene, polypropylene, polyester, polyimide.

23. The laminate of claim 21 wherein the substrate is selected from the group consisting of polyethylene, polypropylene, polyester, polyimide.

* * * * *